May 30, 1961  J. B. LE POOLE  2,986,634
METHOD OF EXAMINING THE QUALITY OF ELECTRON-OPTICAL
IMAGES AND DEVICES FOR CARRYING OUT THIS METHOD
Filed Jan. 13, 1959  3 Sheets-Sheet 1
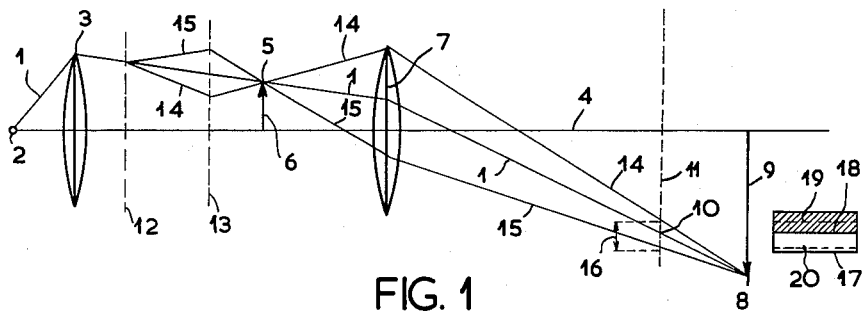
FIG. 1
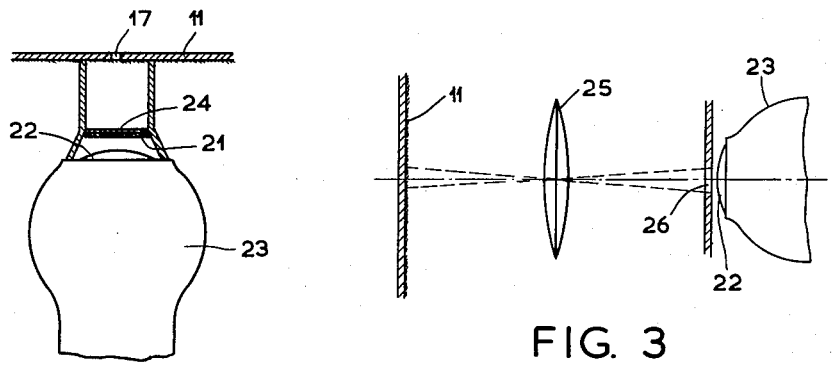
FIG. 2
FIG. 3
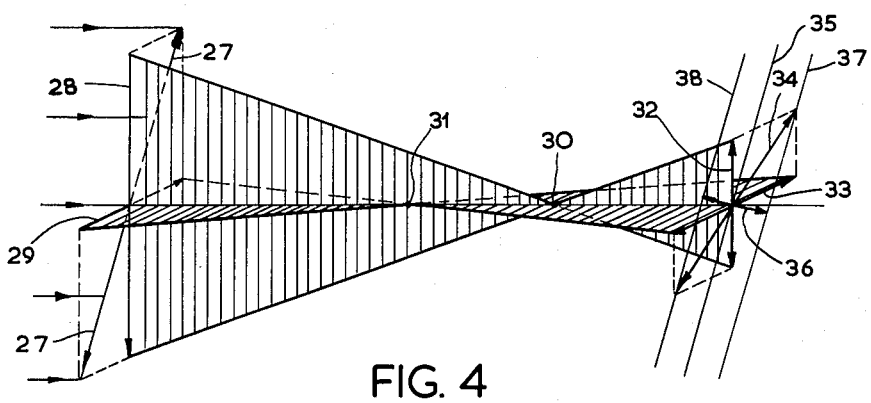
FIG. 4
INVENTOR
JAN BART LE POOLE
BY
AGENT May 30, 1961

J. B. LE POOLE 2,986,634

METHOD OF EXAMINING THE QUALITY OF ELECTRON-OPTICAL
IMAGES AND DEVICES FOR CARRYING OUT THIS METHOD

Filed Jan. 13, 1959

INVENTOR
J.B. LE POOLE

BY
AGENT

United States Patent Office 2,986,634
Patented May 30, 1961

2,986,634
METHOD OF EXAMINING THE QUALITY OF ELECTRON-OPTICAL IMAGES AND DEVICES FOR CARRYING OUT THIS METHOD

Jan Bart Le Poole, Delft, Netherlands, assignor to North American Philips Company, Inc., New York, N.Y., a corporation of Delaware Filed Jan. 13, 1959, Ser. No. 786,581

2 Claims. (Cl. 250—49.5)

In U.S. patent specification No. 2,485,754 a method of sharp adjustment of the image of an electron microscope has been described. In this method the direction of the ray beam is rapidly changed periodically so that the image producing ray cones are apparently widened. Thus, the quality of a sharp adjusted image is not changed, but the lack of definition of an incorrectly adjusted image is temporarily increased and thus better perceptible.

This application is a continuation-in-part of U.S. application Serial No. 516,727, filed June 20, 1955, now U.S. Patent No. 2,873,378 granted February 10, 1959.

The invention extends this method so that the position of the image plane can be determined at a given lens power with a higher degree of accuracy whilst by varying the focal length of the lens the image can be located in the required plane. According to the invention an electrical measuring device takes over the function of the eye in sharp adjustment. This provides not only a higher degree of accuracy but also permits adjustment at an intensity of the rays which is too weak for visual observation.

According to the invention, whilst the direction of the image producing ray-cones is rapidly changed periodically, the electron current is measured which passes through a small part of the pick-up surface, which part contains the edge of an image detail, which edge makes an angle with the direction in which the ray beam moves over the pick-up surface. Hereinafter the said small part of the pick-up surface will be referred to as "measuring area." When the image is not sharp, the edge of the image detail moves over the measuring area. This produces a periodic variation of the measured electron current. By varying the distance between the pick-up surface and the lens or by varying the focal length of the lens this periodic variation is increased or decreased. The arrangement may be such that the variation is a minimum (in a perfect lens is zero). This provides the optimum definition. It will be understood that with a given lens adjustment the current variation will be largest and the measurement will be most correct, when the edge of the image detail is a straight line at right angles to the direction of displacement of the beam and the measuring surface is elongated and also extends at right angles to this displacement.

The electron current passing through the measuring area is very weak so that direct amplification of the current variations will give rise to inconvenient noise. Consequently, preferably use is made of an electron multiplier comprising a photocathode for measuring.

As will be described hereinafter, the invention also relates to a method of examining electron-optical lenses concerning astigmatism.

The invention will be described more fully with reference to the accompanying diagrammatic drawing, in which Fig. 1 illustrates the effect of the rapid periodic displacement of the ray cones;

Fig. 2 shows a detail of the input part of the electron multiplier for use in carrying out the method in accordance with the invention, Fig. 3 illustrates an alternative method to transmit the signal to be measured to the electron multiplier;

Figures 4, 5 and 6 relate to the use of the invention for determining the astigmatism of an electron-optical lens;

Figure 5:
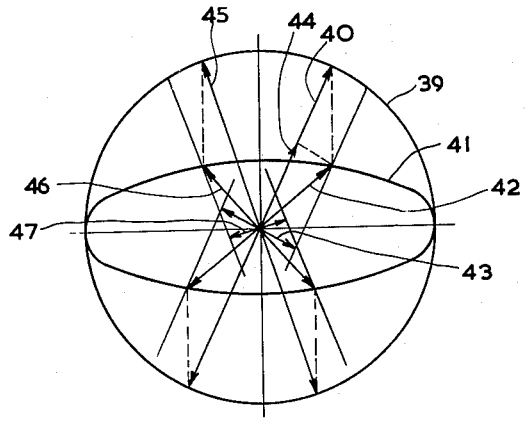

Fig. 1 shows the path of an electron beam in an electron-optical system from its source to the image. Since in these systems the rays which pass through a point of the object usually substantially do not diverge, in Figure 1 the beam for the sake of clarity is shown as a line 1 emanating from a point emitter 2. That ray has been chosen which, after having been refracted in the condenser 3 towards the optical axis 4, strikes the extreme point 5 of the object 6. Subsequently the ray is directed by the objective 7 to the corresponding point 8 of the image 9. Owing to the slenderness of the beam its sectional area is very small in the point 10 in which the line 1 intersects the surface intended for the projection of the image, for example a fluorescent screen 11. Consequently, if the surface 11 is not spaced away from the image by a large distance, the eye is not able to ascertain that in this plane no sharp image is produced.

As has already been described in U.S. patent specification No. 2,485,754, the ray may be caused to impinge on the pick-up surface 11 at a different angle. For this purpose the beam is refracted when passing through a plane 12 and refracted back through a larger angle when passing through a plane 13 so that it again strikes the initial object point 5. If the beam is thus periodically deflected so that it moves between the lines 14 and 15, the point of intersection with the screen 11 reciprocates through a distance equal in length to the line 16 and the sectional area of the beam is apparently increased so that its perceptibility is improved.

It is assumed that the periodic motion of the beam 1 is effected between lines 14 and 15 in the plane of the drawing. The pick-up screen 11 may have a slit-shaped aperture formed in it the direction of length of which is at an angle to the direction in which the beam oscillates. In Figure 1 this slit is shown as a rectangle 17 viewed in the direction of the optical axis, the longer sides being at right angles to the direction of oscillation. According to the invention the edge of an image detail is projected onto this slit, which edge is also at an angle, preferably at right angles, to the direction of oscillation. The edge is designated 18. Owing to the periodic rapid displacement of the electron beam the edge 18 oscillates through a distance equal in length to the line 16 between the broken lines 19 and 20. In the shaded part of the slit which indicates a portion of the image detail which is impervious to electron rays, consequently, the electron current is zero, at least considerably weaker than in the non-shaded part. The total value of the current passed by the slit will vary with the position of the edge 18 and assume a minimum value, when the edge is coincident with the line 20, and a maximum value, when the edge is coincident with the line 19. Thus, the current passing through the measuring area comprises an alternating component which can be amplified and measured and which decreases according as the pick-up surface approaches the actual image plane. The measurement will be most accurate if the measuring area and the image edge are both at right angles to the direction of oscillation.

In order to measure this alternating current component according to the invention a fluorescent screen 21 (Fig. 2) can be arranged behind an aperture 17 in the pick-up screen 11 (for example the fluorescent screen of an electron microscope), said aperture constituting the measuring area, whilst the screen 21 must be sufficiently large to catch the entire electron current passing through the slit 17 and co-operates with a photo-cathode 22 of an electron multiplier 23. On the side nearer the electron source the screen 21 is coated with a layer of metal 24, for example an aluminium layer, which must reflect the light from the screen 21 and intercept the light coming from the other side, for example from the fluorescent pick-up screen 11.

Alternatively, in a system in accordance with the invention, the electron multiplier may be excited in that a small part equal in size to the measuring area of the fluorescent screen 11 is projected by means of an optical system, for example a lens 25 (Fig. 3), onto a slit 26 behind which the photo-cathode 22 of the electron multiplier 23 is arranged. This does not require the production of a sharp image by the optical system 25. This method is of particular advantage in electron microscopes comprising a transparent screen, since in this event the entire measuring system may be arranged outside the microscope adjacent the pick-up screen so that the microscope need not be modified.

The frequency at which the electron beam oscillates and consequently also the frequency of the alternating current required to be measured may be chosen at random. Thus amplification may be effected by means of a selective and consequently sensitive amplifier.

From the measured alternating current, data can be derived concerning the astigmatism of the objective used. As a result the method in accordance with the invention can be used for testing lenses and lens-systems. This fact can be utilized in the manufacture of electron microscopes to test lenses prior to mounting them in the microscope. By removing or compensating any asymmetry which might cause astigmatism which is found by carrying out the measurement in accordance with the invention, in many cases an initially unsuitable lens can be corrected.

Astigmatism of a lens means that the lens does not on either side have a single focal point in the optical axis but two points each associated with one of two planes intersecting in the optical axis at right angles. Thus, a point of the optical axis produced a line image in two planes at right angles to the axis and the two line images thus formed are skew lines at right angles to each other. In other planes at right angles to the axis an image of the same point of the axis is produced in the shape of an ellipsoidal area. Consequently in an astigmatic lens no point of the object produces a sharp image.

When a beam emanating from a point of the optical axis is caused to trace out a conical surface, i.e. the beam has two simultaneous oscillating motions at right angles to each other and at the same amplitude but with a phase difference of 90° imparted to it, the beam, if the lens does not exhibit astigmatism, beyond the lens traces out a circle on a plane at right angles to the axis, which circle changes to a point in the image plane. In an astigmatic lens however, the beam emanating from the lens does not trace out a circle but an ellipse. This ellipse changes to a straight line in two pick-up surfaces.

When carrying out these measurements various methods may be used to accelerate the measurement. Thus, instead of using a slit-shaped measuring area use may be made of two measuring areas which enclose a given angle with one another. If this angle is a right angle, the amplified signal can be supplied to two detectors one of which is sensitive only to the phase of the alternating voltage which is derived from one measuring area whilst the other is sensitive only to the phase of the alternating voltage which is derived from the other measuring area. Thus, two oscillations at right angles to each other are measured simultaneously.

If during measurement the lens power of the electron velocity are changed, the accuracy of the result is adversely affected. A method which permits of eliminating this influence will be explained with reference to Figures 4, 5 and 6.

In Figure 4 reference numeral 27 designates a direction line passing through the optical axis in a plane at right angles to this axis. Along this line a beam emanating from a point of the axis, which point may be infinitely remote, moves periodically. The oscillation of this beam can be resolved into two components 28 and 29 at right angles to each other in the directions of the astigmatism. The image point 30 (which may be a focal point) is associated with the oscillation 28, the image point 31 (which may be a focal point) is associated with the oscillation 29. For convenience sake the oscillation 28 is assumed to be vertical whilst the oscillation 29 is assumed to be horizontal. The plane figures which are swept by the beam which oscillates vertically and horizontally are shown shaded in the figure. In the pick-up surface the oscillation 28 produces a vertical oscillation 32 of the point of intersection of the beam with this surface, whilst the oscillation 29 produces a horizontal oscillation 33. The oscillations 32 and 33 are compounded to form an oscillation 34 which, due to the astigmatism, is at an angle to the direction 35 of the initial oscillation 27. It can be proved that the component 36 of the oscillation 34 at right angles to the direction 35 is much less dependent upon the lens power than the component of 34 in the direction 35. This is due to the fact that the distance between the points 30 and 31 expressed as a percentage of the mean focal length is constant. When the focal length is changed by variation in the electric quantities which determine the refractive power of the lens, the end of vector 34 moves along a line (37, 38) which is substantially parallel to 35.

Figure 6:
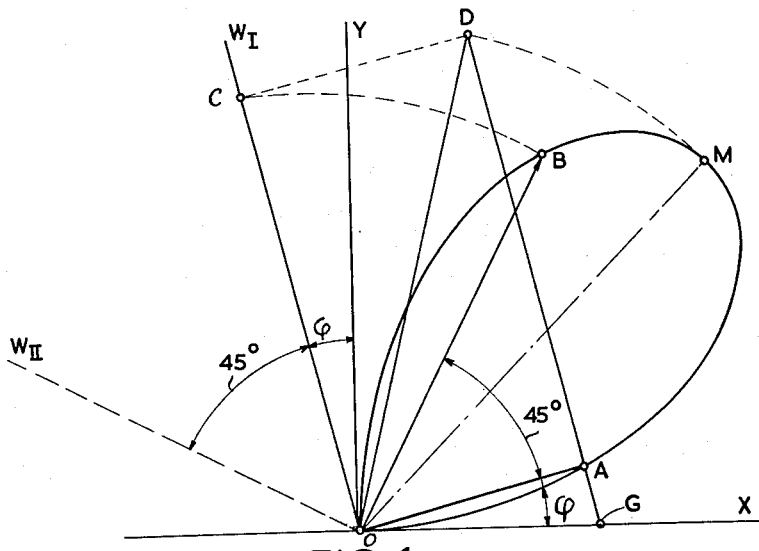

Fig. 5 shows a circle 39 which the point of intersection of the beam would trace out upon the pick-up surface if the beam incident into the lens should perform circular movement about the axis and the point 30 should be shifted to coincide with the point 31 (no astigmatism). In this event the oscillation 27 would produce an oscillation 40 in the initial direction. Due to the astigmatism, however, the circle 39 is changed to an ellipse 41 and the oscillation 27 produces on the pick-up surface an oscillation which is shown by 42. Of this oscillation the component 43 at right angles to 40 is slightly and the component 44 highly dependent upon the lens adjustment. With a vertical oscillation the component 43 assumes zero value, and likewise with a horizontal one. An initial oscillation at right angles to 27 would produce the same value for the component at right angles thereto. However, if now a second measurement is taken with the use of an oscillation in the direction 45, which oscillation encloses an angle of 45° with 40 (27) and produces the oscillation 46 on the pick-up surface, the component 47 of 46 at right angles to the direction 45 is obtained which likewise varies only slightly with variation in the refractive power of the lens. By means of the two components 43 and 47 obtained by carrying out two measurements with the use of two oscillations at an angle of 45° and with a position of the measuring area each time in the direction of the oscillations the value and direction of the astigmatism can be ascertained as follows:

When 27 is rotated through 360° the vector 36 in Fig. 4 describes a figure consisting of four closed curves, for it is proportional to the product obtained by multiplying the sine and the cosine of the angle enclosed between 27 and 29. One of the curves of this figure is shown in Fig. 6.

It is assumed that the vectors OA and OB which enclose an angle of 45° have been determined by the measurement. The associated directions of the vector 27 are designated $W_I$ and $W_{II}$. These directions consequently also enclose an angle of 45°. On $W_I$ a length OC equal to OB is marked, OA and OC are adjacent sides of the rectangle OADC. The angle enclosed by OA and the horizontal axis X is called $\varphi$, so that the angle enclosed by $W_I$ and the vertical axis Y is also $\varphi$. If the angle DOC can be determined the position of the co-ordinates is known.

$$\tan DOC = \frac{CD}{CO} = \frac{OA}{OB}$$

Now $OA=K \sin \varphi \cos \varphi$ and $OB=K \sin (\varphi+45°) \cos (\varphi+45°)$. In this expression K is a constant which depends on the length of the vector 27 and the axial distances in Fig. 4. Consequently $$\tan DOC = \frac{\sin \varphi \cos \varphi}{\sin (\varphi+45° \text{ C.}) \cos (\varphi+45°)}$$

$$= \frac{\sin \varphi \cos \varphi}{(\sin \varphi \cos 45° + \cos \varphi \sin 45°)(\cos \varphi \cos 45° - \sin \varphi \sin 45°)}$$

$$\frac{2 \sin \varphi \cos \varphi}{(\sin \varphi + \cos \varphi)(\cos \varphi - \sin \varphi)} = \frac{2 \sin \varphi \cos \varphi}{(\cos^2 \varphi - \sin^2 \varphi)}$$

$$\frac{\sin^2 \varphi}{\cos^2 \varphi} = \tan 2\varphi$$

Consequently the angle $DOC=2\varphi$, so that the Y axis is the bisector of the angle COD and thus the co-ordinates are determined.

It will be seen from the figure that $$OD=DG=DA+AG=OC+AG=OB+OA \tan \varphi$$

Consequently $OD=K \sin (\varphi+45°) \cos (\varphi+45°)+K \tan \varphi \sin \varphi \cos \varphi = \frac{1}{2}K(\cos^2\varphi - \sin^2\varphi) + K \sin^2\varphi = \frac{1}{2}K (1-2 \sin^2\varphi) + K \sin^2\varphi = \frac{1}{2}K - K \sin^2\varphi + K \sin^2\varphi = \frac{1}{2}K$.

This is the maximum value OM which the vector 36 assumes when rotated about the point O, i.e. K sin 45° cos 45°. Consequently the diagonal OD represents the value of the entire astigmatism.

Figures 7, 8, 9:
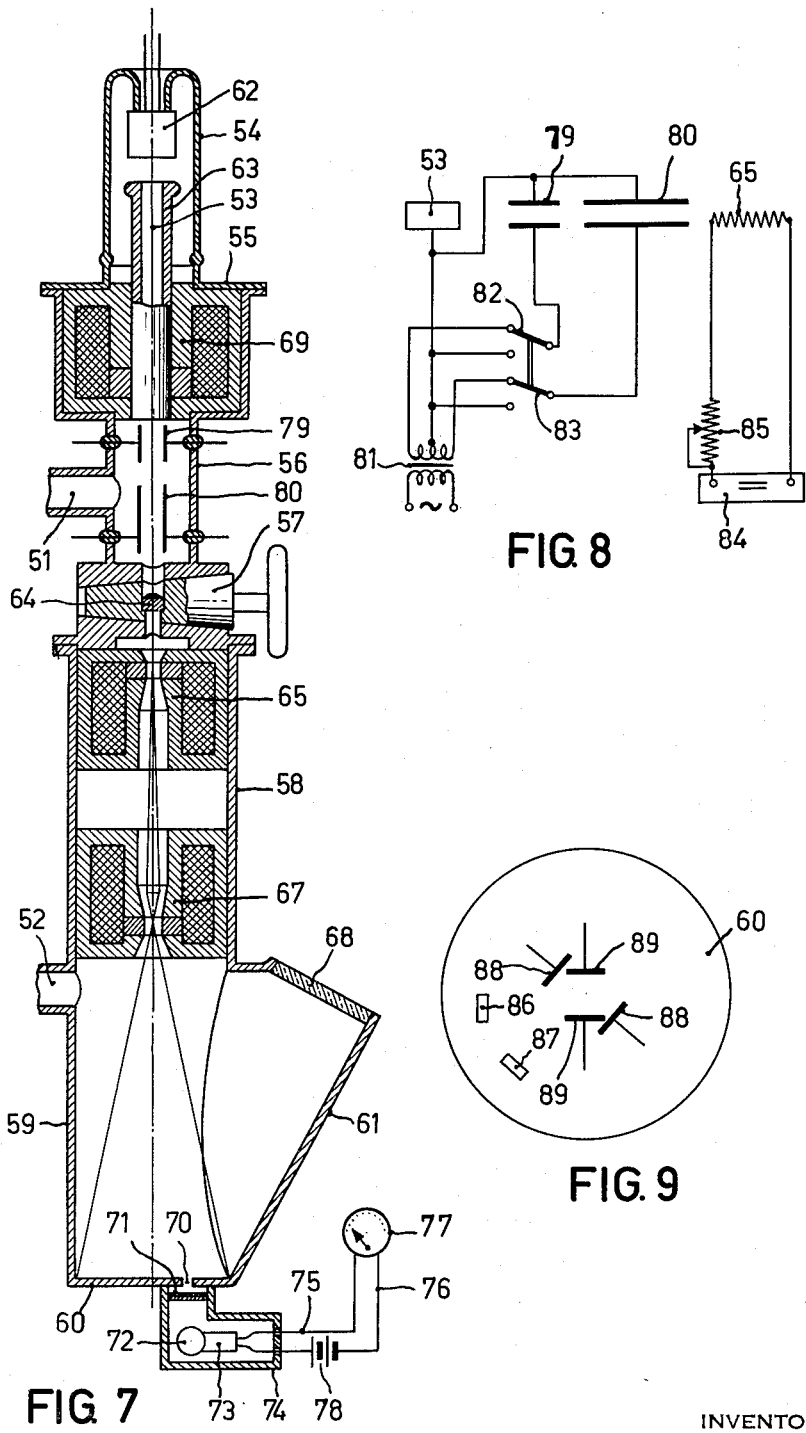
Fig. 7 shows a microscope employing a device for determining the astigmatism of the electron-optical lens.
Fig. 8 is a circuit diagram of the microscope energizing system.
Fig. 9 is a plan view of the astigmatism correcting device showing the position of the slits.

Without the stability of the microscope having to satisfy exacting requirements a sufficient period of time is available for carrying out the measurement. A measuring time of for example 1 minute forms no objection to a high sensitivity of the arrangement. In a suitable embodiment the measuring area is 20 mms. long and for testing the image definition is 1.5 to 2 mms. wide. For determining the astigmatism with the use of two directions of oscillation at an angle of 45° to one another a narrower slit, for example a slit 0.5 mm. wide, is to be preferred. If as an object a preparate is used which withstands an intense irradiation, an astigmatism of 50 A. (distance between the focal lines) can be measured. Consequently the measuring method in accordance with the invention is at least ten times more sensitive than the conventional methods. Use may be made of any conventional deflecting systems, both electro-magnetic and electrostatic systems and employment of the electron microscope. An embodiment of the electron microscope comprising an electrostatic deflection system is shown in Fig. 7.

The microscope is a closed vessel connected through a pair of suction pipes 51 and 52 to an air pump and thus kept exhausted. The axis of the microscope is designated by 53.

At the top of the microscope, a glass portion 54 is sealed to a metal box 55. The box carries a metal connecting piece 56 the bottom of which is provided with a plug or stopper cock 57. Next there is a wider cylinder 58 and finally an end portion 59 closed by a bottom 60 and provided at one side with an oblique branch 61.

Arranged within the glass portion 54 are a source of electrons 62 and a cylinder 63 secured to the metal box 55. The metal box contains the electron-optical condensor lens 69.

The plug cock 57 is provided with a container 64 which serves for receiving the object. The cylinder 58 contains the electro-magnetic objective lens 65 and the electro-magnetic magnifying lens 67.

The branch 61 serves for the observation of the image screen on the bottom 60 and is hermetically closed by a glass plate 68.

The construction and function of the lenses 65, 67 and 69 are well-known, so that no further explanation will be required.

For measuring purposes, a slit 70 is provided in the bottom 60 which allows electron rays to pass and impinge on a fluorescent screen 71 to produce a glow that will be picked up by the photocathode 72 of the electron multiplier tube 73, which is arranged in a housing 74. Current leads 75 and 76 are connected to the multiplier and to the measuring instrument 77. The circuit contains the voltage source 78.

For the purpose of obtaining sharp adjustment of the image produced on the image screen, the connecting piece 56 comprises two pairs of deflection plates 79 and 80, which are provided with supply conductors passed through the wall of the connecting piece 56 in an insulated manner, so that they are adapted to convey a suitable voltage. The plates are assumed to have their planes at right angles to the plane of the drawing so that, if a potential difference is set up between the plates, the beam is deflected, but remains in the plane of the drawing. Similarly, two pairs of plates parallel to the plane of the drawing are provided for deflecting the beam in a plane at right angles to the drawing to enable observation and correction of astigmatism in the beam as described in connection with Fig. 4. These plates are not shown because they would unnecessarily complicate the drawing and would make it difficult to visualize the deflection system.

The slit 70 provided in the bottom 60 has a longitudinal shape, the direction of length of which is perpendicular to the plane of the drawing so that the oscillating electron beams move at right angles to that direction.

When operating the electron microscope, the deflection system may be energized by means of the circuit arrangement shown in Fig. 8. In this figure, the anode 53, the deflecting plates 79 and 80 and the focusing lens coil 65 are shown. A transformer 81 supplies an alternating voltage at one of each pair of plates 79 and 80. The other one of each pair are connected to each other and to the center of the secondary winding of transformer 81. The connections extend via switches 82—83 which are mechanically coupled and thus moved as one assembly. The circuit of lens coil 65 includes a source 84 of direct current and comprises a control resistance 85 for adjusting the optical strength of the lens 65.

In the position shown, the switches 82—83 connect the plates to the transformer 81 so that an alternating current of opposite sign is supplied to the pairs of deflecting plates. As a consequence, the electron beam is moved so that, when a detail edge 18 of the image produced an the image screen is projected onto the slit, the oscillation thereof produces a current through the measuring instrument 77 having an alternating component which can be reduced as far as possible by adjustment of the control resistance 85. After that the most satisfactory focussing has been obtained and the switches 82—83 may be turned over to its other positions in which the plates are connected to the anode 53 and the electron beam enters straight into the microscope.

For the purpose of measuring quantities concerning the astigmatism of the objective lens used, the bottom 60 may be provided with two slits 86, 87. In accordance with the prior explanation, the direction of length of these slits extends parallel to the planes of two oscillations including an angle of 45°. In the Fig. 9, the position of the slits 86 and 87 and of the deflecting plates 88—89 are diagrammatically shown in a view in the direction of the microscope axis.

What is claimed is:

1. A method of determining the astigmatism in the image produced by an electron-optical image producing device which includes an electron-optical system for focussing an electron beam on a receiving screen and two measuring areas enclosing a given angle therebetween in the path of the beam comprising the steps of, oscillating the electron beam in two directions at right angles to each other, and measuring the phase of an alternating voltage derived from each of the measuring areas.

2. A method of determining the astigmatism in the image produced by an electron-optical image producing device which includes an electron-optical system for focussing an electron beam on a receiving screen and a measuring area forming a small portion of the image screen comprising the steps, oscillating the electron beam in a first plane containing the direction of length of the measuring area, measuring variations in intensity of the electron beam in said first plane, and measuring variations in intensity of the electron beam in a second plane forming an angle of 45° with the first plane.

References Cited in the file of this patent

UNITED STATES PATENTS

| | | |
|---|---|---|
| 2,485,754 | Le Poole | Oct. 25, 1949 |
| 2,627,589 | Ellis | Feb. 3, 1953 |
| 2,873,378 | Le Poole | June 20, 1955 |

FOREIGN PATENTS

| | | |
|---|---|---|
| 687,207 | Great Britain | Feb. 11, 1953 |